United States Patent
Zhao et al.

(10) Patent No.: US 11,113,103 B2
(45) Date of Patent: Sep. 7, 2021

(54) TASK PARALLEL PROCESSING METHOD, APPARATUS AND SYSTEM, STORAGE MEDIUM AND COMPUTER DEVICE

(71) Applicant: Shanghai Cambricon Information Technology Co., Ltd, Shanghai (CN)

(72) Inventors: Yongwei Zhao, Shanghai (CN); Xiaofu Meng, Shanghai (CN)

(73) Assignee: Shanghai Cambricon Information Technology Co., Ltd, Shanghai (CN)

(*) Notice: Subject to any disclaimer, the term of this patent is extended or adjusted under 35 U.S.C. 154(b) by 112 days.

(21) Appl. No.: 16/702,502

(22) Filed: Dec. 3, 2019

(65) Prior Publication Data
US 2020/0125406 A1  Apr. 23, 2020

Related U.S. Application Data (63) Continuation of application No. PCT/CN2018/108298, filed on Sep. 28, 2018.

(30) Foreign Application Priority Data

Nov. 20, 2017 (CN) .......................... 201711157341.X
Dec. 29, 2017 (CN) .......................... 201711484410.8
(Continued)

(51) Int. Cl.
*G06F 3/00* (2006.01)
*G06F 9/48* (2006.01)
(Continued)

(52) U.S. Cl.
CPC .............. *G06F 9/4881* (2013.01); *G06F 9/38* (2013.01); *G06F 9/4856* (2013.01); *G06F 9/54* (2013.01);
(Continued)

(58) Field of Classification Search
CPC .................................. G06F 9/4881; G06F 9/54
(Continued)

(56) References Cited

U.S. PATENT DOCUMENTS 9,799,088 B2 * 10/2017 Frascati ................ G06T 15/005
2013/0125097 A1 * 5/2013 Ebcioglu ............... G06F 8/4452
717/136
(Continued)

FOREIGN PATENT DOCUMENTS

CN    102012844 A    4/2011
CN    104239137 A    12/2014
(Continued)

OTHER PUBLICATIONS

Stanley Tzeng, A GPU Task-Parallel Model with Dependency Resolution. (Year: 2012).*
(Continued)

*Primary Examiner* — Lechi Truong
(74) *Attorney, Agent, or Firm* — Bayes PLLC (57) ABSTRACT

Systems and methods for scheduling an instruction list for parallel processing tasks are provided. An exemplary method includes obtaining an instruction set in the instruction list to be scheduled and determining data dependencies among instructions in the instruction set by performing a data dependency analysis on the instruction set. The method also includes obtaining, based on the data dependencies, selection nodes for performing instruction selections during the scheduling of the instruction list. The method further includes determining, based on a preset rule, an order of instructions in a scheduled instruction list according to a corresponding order of the selection nodes.

16 Claims, 4 Drawing Sheets

(30) Foreign Application Priority Data

Jan. 29, 2018 (CN) .......................... 201810083577.1
Jan. 29, 2018 (CN) .......................... 201810084077.X (51) Int. Cl.
*G06F 9/38* (2018.01)
*G06N 3/04* (2006.01)
*G06N 3/10* (2006.01)
*G06F 9/54* (2006.01)

(52) U.S. Cl.
CPC .............. *G06F 9/547* (2013.01); *G06N 3/04* (2013.01); *G06N 3/10* (2013.01)

(58) Field of Classification Search
USPC ........................................................ 719/310
See application file for complete search history.

(56) References Cited

U.S. PATENT DOCUMENTS

| | | | |
|---|---|---|---|
| 2015/0074675 A1 | 3/2015 | Qi et al. | |
| 2016/0103677 A1 | 4/2016 | Melski | |

FOREIGN PATENT DOCUMENTS

| | | | |
|---|---|---|---|
| CN | 106156810 A | 11/2016 |
| CN | 107103113 A | 8/2017 |
| CN | 107341127 A | 11/2017 |
| JP | H09171503 A | 6/1997 |
| WO | 2016057887 A1 | 4/2016 |
| WO | 2017163442 A1 | 9/2017 |

OTHER PUBLICATIONS

Extended European search report in related European Application No. 19210491.7, dated Apr. 9, 2020, 10 pages.
International Search Report and Written Opinion in corresponding International Application No. PCT/CN2018/108298, dated Dec. 29, 2018, 6 pages.
First Office action issued in related Chinese Application No. 201810084077.X, dated Oct. 21, 2019, 7 pages.
First Office action issued in related Chinese Application No. 201810083577.1, dated Oct. 22, 2019, 10 pages.
Extended European search report issued in related European Application No. 18878728.7, dated Sep. 23, 2020, 11 pages.
Matt Welsh et al: "SEDA: An Architecture for Well-Conditioned, Scalable Internet Services", Operating Systems Review, ACM, New York, NY, US, vol. 35, No. 5, Oct. 21, 2001, pp. 230-243, XP058184710, 14 pages.
First Office Action issued in related Chinese Application No. 20171157341.X, dated Jun. 29, 2020, 9 pages.
Office Action issued in related Japanese Application No. 2019-568198, dated Mar. 2, 2021, 2 pages.
First Office action issued in related Chinese Application No. 201711484410.8, dated Oct. 28, 2019, 6 pages.

* cited by examiner

TASK PARALLEL PROCESSING METHOD, APPARATUS AND SYSTEM, STORAGE MEDIUM AND COMPUTER DEVICE

The present application is a continuation of International Application No. PCT/CN2018/108298, filed Sep. 28, 2018, which claims the benefits of priority to: Chinese Patent Application No. 201711157341.X with the title of "Task Parallel Processing Method, Storage Medium, Computer Equipment, Device, and System" filled on Nov. 20, 2017; Chinese Patent Application No. 201711484410.8 with the title of "Instruction List Scheduling Method, Device, Computer Equipment, and Storage Medium" filled on Dec. 29, 2017; Chinese Patent Application No. 201810084077.X with the title of "Computer Equipment, Data Processing Method, and Storage Medium" filled on Jan. 29, 2018; and Chinese Patent Application No. 201810083577.1 with the title of "Computer Equipment, Data Processing Method, and Storage Medium" filled on Jan. 29, 2018. The entire contents of each of the above-identified applications are expressly incorporated herein by reference.

TECHNICAL FIELD

The present disclosure relates to the fields of information technology and computer technology, and in particular relates to an instruction list scheduling method, device, computer equipment, and storage medium.

BACKGROUND

With the rapid development of computer technology, the multi-processor computing system which includes multiple first processors has emerged, such as the multi-core processor computing system and the heterogeneous computing system. The multiple first processors of the above-mentioned computing system can process different instructions in parallel according to the instruction lists corresponding to the multiple first processors, thereby improving processing efficiency of the computer system.

However, the order of the instructions in the instruction lists corresponding to the multiple first processors may be unreasonable. For instance, the instructions in the instruction list are not parallelized as far as possible, which may lead to a situation that the processing efficiency of the computing system cannot be improved, or the efficiency improvement fails to meet expectations.

Thus, it has become an important issue to provide an instruction list scheduling method, device, computer equipment, and storage medium for reordering the instructions of an instruction list in a more compact manner, and shortening the execution time of the instruction list.

SUMMARY

The present disclosure provides methods, systems, devices, computer equipment, and storage media for scheduling an instruction list to overcome the above-mentioned problem of unreasonable order of the instructions in an instruction list used by a processor.

In one example, a method for scheduling an instruction list may include obtaining an instruction set in the instruction list to be scheduled and determining data dependencies among instructions in the instruction set by performing a data dependency analysis on the instruction set. The method may also include obtaining, based on the data dependencies, selection nodes for performing instruction selections during the scheduling of the instruction list. The method may further include determining, based on a preset rule, an order of instructions in a scheduled instruction list according to a corresponding order of the selection nodes.

In another example, a system for scheduling an instruction list may include a memory storing a computer program and a processor coupled to the memory and configured to execute the computer program to perform operations. The operations may include obtaining an instruction set in the instruction list to be scheduled and determining data dependencies among instructions in the instruction set by performing a data dependency analysis on the instruction set. The operations may also include obtaining, based on the data dependencies, selection nodes for performing instruction selections during the scheduling of the instruction list. The operations may further include determining, based on a preset rule, an order of instructions in a scheduled instruction list according to a corresponding order of the selection nodes.

In a further example, a computer-readable medium may be provided. The computer-readable medium may store a computer program that, when executed by a processor, causes the processor to perform operations. The operations may include obtaining an instruction set in the instruction list to be scheduled and determining data dependencies among instructions in the instruction set by performing a data dependency analysis on the instruction set. The operations may also include obtaining, based on the data dependencies, selection nodes for performing instruction selections during the scheduling of the instruction list. The operations may further include determining, based on a preset rule, an order of instructions in a scheduled instruction list according to a corresponding order of the selection nodes.

Embodiments of the present disclosure may improve upon conventional technologies by optimizing the selection of instructions for a current state for each instruction selection process. Using an optimally scheduled instruction list, instructions may be sorted in a more compact manner, thereby shortening execution time for an instruction sequence of an initial instruction list.

DETAILED DESCRIPTION OF THE EXAMPLES

In order to make the purposes, technical schemes, and technical effects of the present disclosure clearer, examples of the present disclosure will be described hereinafter with reference to the accompanied drawings. It should be understood that the examples described herein are merely for explaining the present disclosure, rather than limiting the present disclosure. It should be noted that, provided that there is no contradiction, the examples of the present disclosure and features of the examples can be combined with each other. It should be understood that the terms such as "first", "second" and the like used in the examples of the present disclosure are for distinguishing between different objects rather than describing any particular order or technical meaning.

Figure 1:
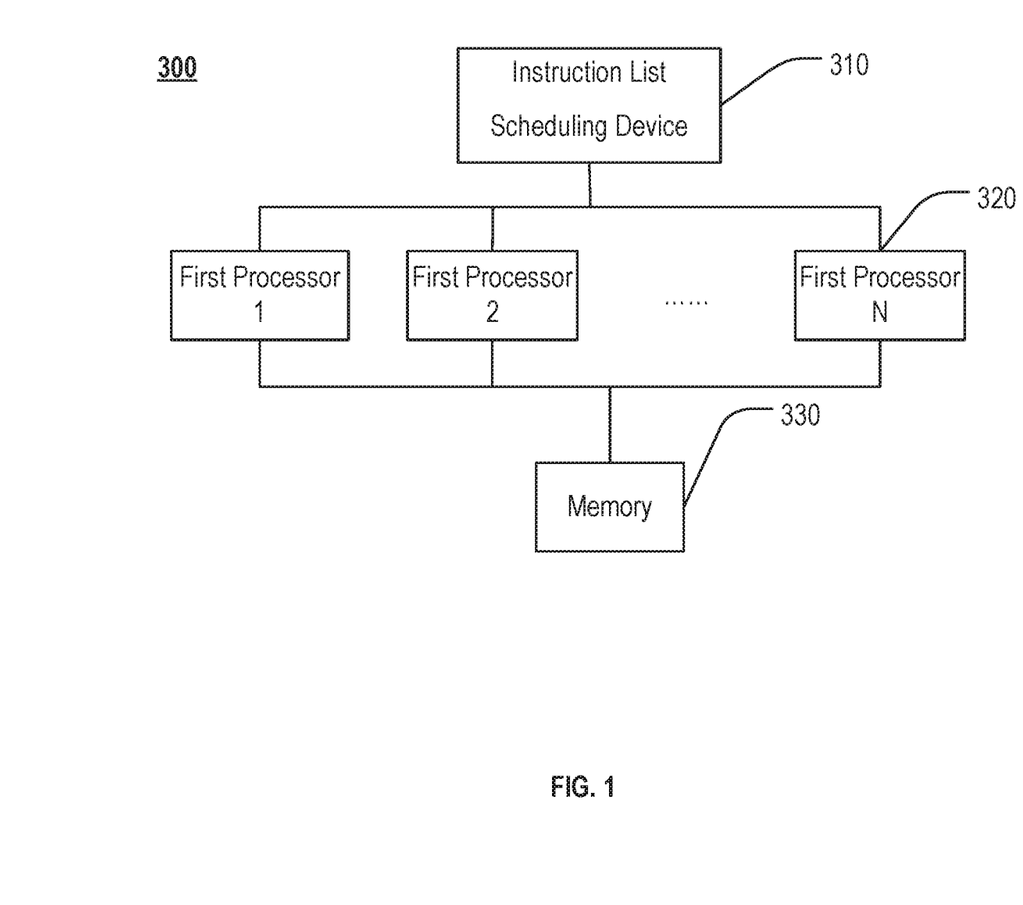
FIG. 1 is a structural diagram of a computer system according to an example of the present disclosure.

As shown in FIG. 1, a computer system 300 of an example of the present disclosure may be a multi-processor computing system that has a plurality of processors, such as multi-core processor computing system, heterogeneous computing system, and the like. Alternatively, the computer system may specifically include an instruction list scheduling device 310, a plurality of first processors 320, and a memory 330. The plurality of first processors 320 can be connected to the instruction list scheduling device 310 simultaneously, and the instruction list scheduling device 310 can be used for the instruction list rescheduling of the plurality of first processors 320. Alternatively, the instruction list scheduling device 310 may include a second processor. Alternatively, the second processor may include an obtaining unit, a data dependency analysis unit, an evaluation unit, a computation unit, a controlling unit, etc. The obtaining unit may be a hardware unit such as an IO (input/output) interface. The computation unit and the controlling unit may both be hardware units.

The plurality of first processors 320 can perform parallel processing on different instructions according to an instruction list to improve the processing efficiency of the computer system. Alternatively, an instruction list may include one or a plurality of instructions. Each instruction may include a group of reference operations on resources.

The resources that are referred to by an instruction may be known by reading or executing the instruction. In other words, when a first processor and the like execute the instruction, the processor can call the resources referred to by the instruction to realize specific operation. For instance, the instruction may be a loading instruction, a computing instruction, a storing instruction, etc., and may also be N layers of computations of a neural network, where N>0, N can be an integer or a non-integer.

Further, instructions in the instruction list may be sorted by order of execution, resources referred to by the instructions may be virtual memory objects or physical memory objects. The virtual memory objects may be memory blocks, registers, or virtual storage space of other storage devices in software logic, where the storage devices are capable of storing data. Instruction scheduling process of the present example refers to the process of reordering instructions in an instruction list with a precondition that the semantics of an initial instruction list remain the same. By doing so, instructions of the instruction list may be arranged in a more compact manner, which may shorten the execution time of the instruction list and improve the processing efficiency of the system.

For instance, an instruction list may include N instructions, where N≥1, N is an integer, and the N instructions are marked as a first instruction, a second instruction, through an N instruction according to an execution order. A process of scheduling the instruction list is a process of reordering the N instructions.

Specifically, when scheduling an instruction list, the instruction list scheduling device 310 may first obtain data dependencies among instructions in the instruction list to be scheduled. Alternatively, forms of the data dependencies may include RAW (Read After Write), WAR (Write After Read), and WAW (Write After Write). Alternatively, the data dependencies may be described by using DDG (data dependency Graph). Further, the second processor of the instruction list scheduling device 310 may obtain an instruction list to be scheduled through the obtaining unit, and perform data dependency analysis on the instructions in the instruction list to be scheduled through the data dependency analysis unit to obtain data dependencies among the instructions. Specifically, the data dependency analysis unit may perform resource scanning tracing on each instruction in the instruction list to be scheduled, so as to analyze the data dependencies among the instructions. In the present example, the data dependencies among the instructions refer to whether execution of a current instruction depends on an execution result of another instruction, which can be explained with a simple example: if instruction A needs to read and write data written by instruction B, the instruction A may depend on an execution result of the instruction B. Then, the obtaining unit can obtain all selection nodes of each instruction selection performed during an instruction scheduling process according to the data dependencies among the obtained instructions.

Then, through the evaluation unit, the instruction list scheduling device can determine instructions of each order in the scheduled instruction list according to all the selection nodes of corresponding orders by following a preset rule. Alternatively, through the evaluation unit, the second processor can evaluate corresponding selection nodes of a current order to obtain an evaluation result of the selection nodes of the current order, and determine the corresponding instructions of the current order according to the evaluation result. Each selection node may record corresponding sorted instructions and instruction set to be scheduled of the selection node. Alternatively, the evaluation unit may evaluate a corresponding selection node of a current order according to the priority of instructions. Alternatively, the second processor may further set the priority of instructions according to specific content and/or type of the current selection node.

Alternatively, when performing instruction scheduling, the instruction list scheduling device 310 can adjust a corresponding first processor of instructions in an instruction list to be scheduled. For instance, the first processor corresponding to the instructions to be scheduled may be determined according to the type of the instructions, or specific content of the instructions.

Figure 2:
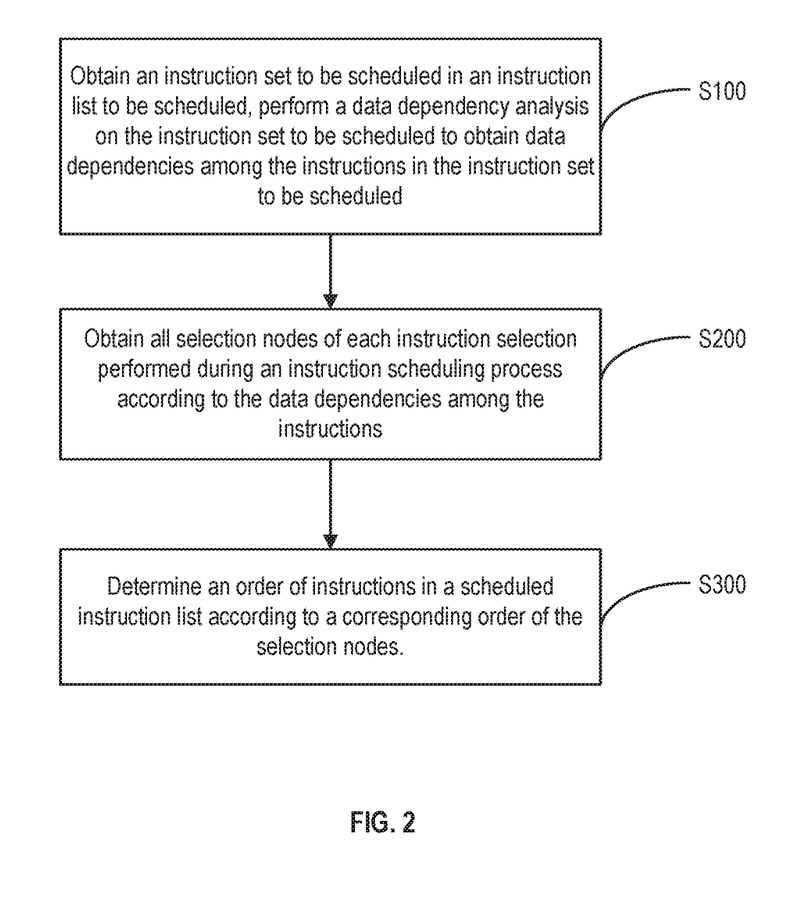
FIG. 2 is a step flowchart of an instruction list scheduling method in an example of the present disclosure.

FIG. 2 is a step flowchart of an instruction list scheduling method in an example of the present disclosure. The instruction list scheduling method may be applied to the computer system shown in FIG. 1. The computer system mentioned above may include a memory 330 and a plurality of first processors 320. The instruction list scheduling method may be used for rescheduling instructions in an instruction list corresponding to the plurality of first processors in the above-mentioned computer system, which may improve the processing efficiency of the computer. Specifically, the method above may include: Step S100: obtaining an instruction set to be scheduled in an instruction list to be scheduled, performing a data dependency analysis on the instruction set to be scheduled to obtain data dependencies among the instructions in the instruction set to be scheduled.

Specifically, the second processor may obtain the instruction set to be scheduled in the instruction list to be scheduled through the obtaining unit of the second processor, and obtain the data dependencies among the instructions through the data dependency analysis unit. The instruction set to be scheduled in the present example may include a plurality of instructions to be scheduled in the instruction list to be scheduled. Alternatively, the instruction set to be scheduled may not include instructions without semantics in the instruction list to be scheduled (e.g., a synchronizing instruction). Further, the obtaining unit obtaining the instruction set to be scheduled in the instruction list to be scheduled may include: obtaining the instruction list to be scheduled, and deleting instructions without semantics in the instruction list to be scheduled to obtain the instruction set to be scheduled.

Figure 3:
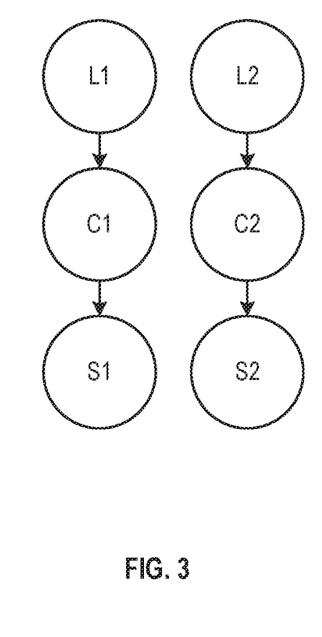
FIG. 3 shows data dependencies among instructions to be scheduled obtained in an example of the present disclosure.

For instance, an instruction set to be scheduled obtained by the obtaining unit includes six instructions {L1, L2, C1, C2, S1, S2}. L1, C1, and S1 need to be executed sequentially, L2, C2, and S2 need to be executed sequentially, and there is no data dependency among other instructions. L1, L2, S1, and S2 are I/O instructions, C1 and C2 are computing instructions. The data dependency analysis unit may perform data dependency analysis on the instructions to be scheduled to obtain data dependencies among the respective instructions in the instruction set to be scheduled, and may use the DDG (Data Dependence Graph) as shown in FIG. 3 to describe the data dependencies.

Resources referred to by the respective instructions to be scheduled in the instruction set to be scheduled may be virtual memory objects or physical memory objects. The virtual memory objects may be memory blocks, registers, or virtual storage space of other storage devices in software logic, where the storage devices may be capable of storing data.

S200: obtaining all selection nodes of each instruction selection performed during an instruction scheduling process according to the data dependencies among the instructions.

Each selection node may record sorted instructions and instruction set to be scheduled corresponding to the selection node. Alternatively, a process of obtaining all selection nodes may be: first, the second processor may obtain all first selection nodes of a first instruction selection through the obtaining unit of the second processor, which in specific, the second processor may obtain sorted instructions and instruction set to be scheduled corresponding to the respective first selection node. It should be understood that the instruction in the instruction sets to be scheduled have data dependencies. Then, the second processor may obtain all second selection nodes correlated with the first selection node through the obtaining unit according to the data dependencies among the first selection node, and the second selection nodes correspond to a second instruction selection. Third selection nodes may be obtained by repeating the step above, and similarly, N selection nodes may be obtained by repeating the step above, where N≥3, N represents a positive integer. First selection nodes obtained from the step above, second selection nodes obtained from the step above, through N selection nodes obtained from the step above, may constitute all selection nodes of each instruction selection performed.

For instance, an instruction set to be scheduled in an obtained instruction list to be scheduled includes six instructions: {L, L2, C1, C2, S1, S2}. Data dependencies among the six instructions are shown in FIG. 3. It can be learned from FIG. 3 that L1 and L2 in the instruction set to be scheduled may be executed without depending on other instructions. Thus, a first instruction selection may be made from L1 and L2. In other words, an obtained first selection node corresponds to two situation: L1 is selected, or L2 is selected. When L1 is selected in the first instruction selection, L1 is a sorted instruction, at this point, the first selection node records the sorted instruction L1, and an instruction set to be scheduled of L1, which is {L2, C1, C2, S1, S2}, is deleted. Similarly, when L2 is selected in the first instruction selection, another first selection node is obtained, the first selection node records the sorted instruction L2, and an instruction set to be scheduled of L2, which is {L1, C1, C2, S1, S2}, is deleted. A second selection node of a second instruction selection may be obtained by repeating the process above, through a sixth selection node of a sixth instruction selection may be obtained.

Figure 4:
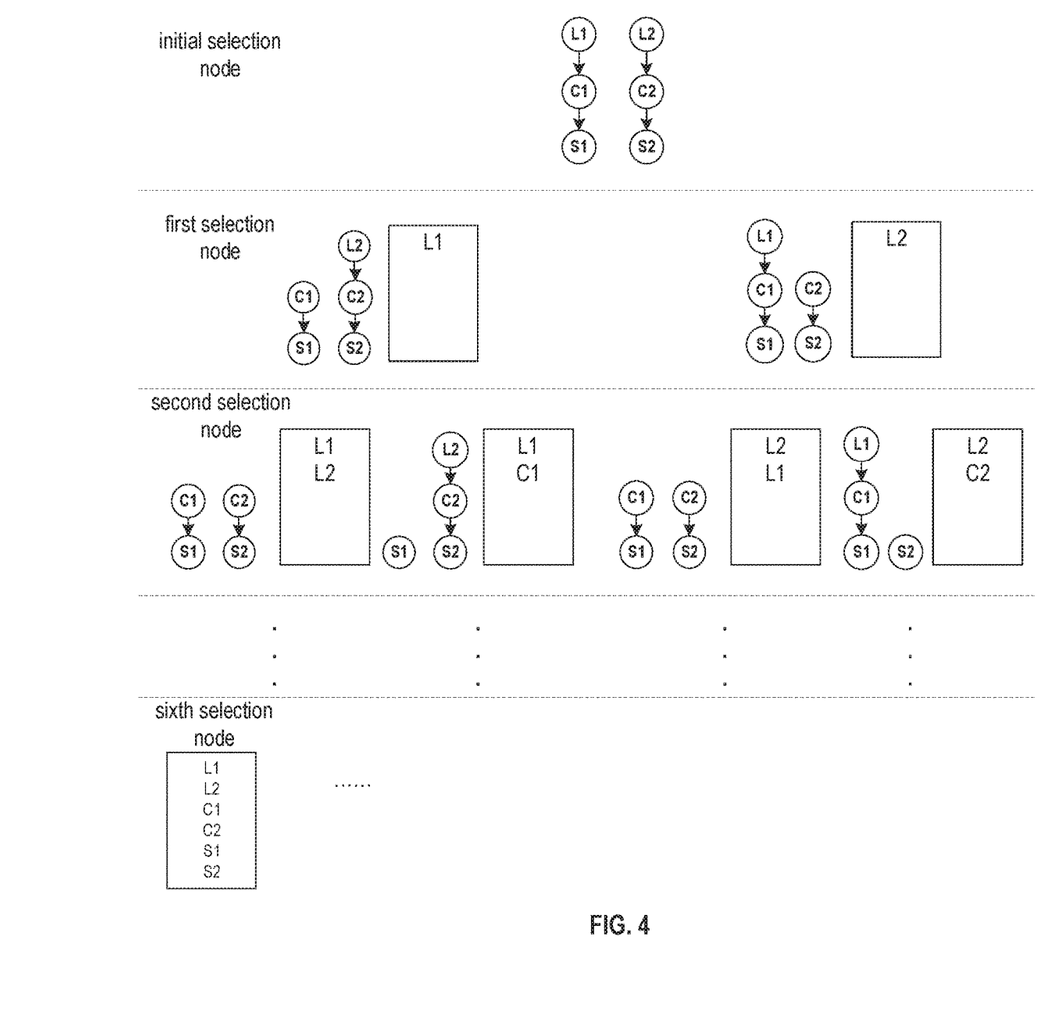
FIG. 4 is an association graph of selection nodes obtained in an example of the present disclosure.

When each instruction selection performed during the present step, it needs to be performed according to an instruction set to be scheduled obtained from a previous instruction selection. Taking an instruction set to be scheduled corresponding to FIG. 3 as an instance, when L1 is an instruction selected in a first instruction selection (corresponding to a first selection node of the first instruction selection), an instruction set to be scheduled which is {L2, C1, C2, S1, S2} is obtained, the instructions L2 and C1 in the instruction set to be scheduled can be performed without depending on other instructions, at this point, a second instruction selection needs to be performed by selecting from L2 and C1 (two second selection nodes exist correspondingly); when L2 is an instruction selected in the first instruction selection (corresponding to another first selection node of the first instruction selection), an instruction set to be scheduled which is {L1, C1, C2, S1, S2} is obtained, the instructions L1 and C2 in the instruction set to be scheduled can be performed without depending on other instructions, at this point, the second instruction selection needs to be performed by selecting from L1 and C2 (two second selection nodes exist correspondingly). It can be learned that correlations may exist among all selection nodes, the correlations of the respective selection nodes is shown in FIG. 4.

S300: following a preset rule, determining instructions of each order in a scheduled instruction list according to the selection nodes of a corresponding order. Alternatively, through the evaluation unit, the second processor can evaluate corresponding selection nodes of a current order to obtain an evaluation result of the respective selection nodes of the current order, and determine corresponding instructions of the current order according to the evaluation result. For instance, when the current order is a second instruction, which corresponds to a second selection node in FIG. 4, four second selection nodes in FIG. 4 may be evaluated according to the preset rule, and a second instruction in the scheduled instruction list may be obtained according to the evaluation result. Alternatively, the evaluation unit may evaluate a selection node corresponding to the current order according to preset priority of each instruction (for instance, L2 has highest priority, C1 has second highest priority . . . ), then obtain an evaluation result. Alternatively, the second processor may set priority of each instruction according to specific content and/or type of the instruction of the current selection node.

Alternatively, the evaluation unit can determine instructions of a corresponding current order according to corresponding shortest execution time of all selection nodes of the current order. For instance, in FIG. 4, for a first selection node corresponding to the instruction L1, corresponding shortest execution time of the first selection node is $t_1$, for a first selection node corresponding to the instruction L2, corresponding shortest execution time of the first selection node is $t_2$, $t_1 > t_2$, then L2 is determined as a first instruction of a scheduled instruction list. Similarly, a second instruction, a third instruction, through a sixth instruction of the scheduled instruction list may be obtained.

The instruction list scheduling method provided in the example may obtain all selection nodes of each instruction selection performed during an instruction scheduling process according to data dependencies among instructions to be scheduled, and then to determine instructions of each order in a scheduled instruction list according to an evaluation result of the selection nodes of each order. The method may guarantee that for each instruction selection, an instruction selected is an optimal result for a current state. With a scheduled instruction list obtained by using the optimal results, instructions may be sorted in a more compact manner, which may thereby shorten execution time of an instruction sequence of an initial instruction list.

As an alternative example, the following the preset rule, by the evaluation unit, determining instructions of each order in a scheduled instruction list according to selection nodes of corresponding orders may include:

step a: accessing the selection nodes, by the evaluation unit, and obtaining corresponding longest execution time of a currently accessed selection node. The selection nodes accessed by the evaluation unit may be a first selection node, a second selection node, through an $N^{th}$ selection node.

step b: if the longest execution time corresponding to the currently accessed selection node is shorter than initial execution time $T_0$, determining a sorted instructions of the currently accessed selection node as corresponding instructions in the scheduled instruction list: the initial execution time is execution time of the instruction sequence of the instruction list to be scheduled.

In the present step, the longest execution time corresponding to the currently accessed selection node refers to execution time of the instruction sequence corresponding to the currently accessed node when the instruction sequence is sorted in a most unreasonable manner. For instance, in FIG. 4, longest execution time of a first second selection node on the left side is $T_1=t_1+t_2+t_3+t_4+t_5$, in which $t_1$ is the execution time of sorted instructions L1-L2, $t_2$ is the execution time of instruction C1, $t_3$ is the execution time of instruction S1, $t_4$ is the execution time of instruction C2, and $t_5$ is the execution time of instruction S2. The above is a case when unsorted instructions corresponding to the selection node C1, C2, S1, S2 are not parallel at all, and the order of the instructions is the most unreasonable. If $T_1<T_0$, L1 and L2 are respectively used as a first instruction and a second instruction of the scheduled instruction list.

Since the longest execution time corresponding to the currently accessed selection node is shorter than the initial execution time, execution time of an instruction sequence obtained by using the instruction list scheduling method provided in the example may not be longer than the execution time of an instruction sequence in the instruction list to be scheduled.

An evaluation unit of the example may follow a preset rule to access a selection node, and may not schedule instructions in the instruction list only according to a selection node of a current order. Thus, a certain instruction of a current order may not influence a selection of following instructions. The method may be particularly suitable for scheduling an instruction list that has instructions requiring a large amount of computation, alternatively, for an instruction list that includes neural network operation instructions. For instance, an instruction list includes N instructions. The N instructions include a weight loading instruction A and a neural network convolutional layer operating instruction B. A traditional method may fail to make the instruction A and the instruction B parallel, and may fail to make a system realize a highest processing efficiency. The instruction list scheduling method of the example may make the instruction A and the instruction B parallel in the scheduled instruction list.

In an example of the present disclosure, the method above may further include: when the corresponding longest execution time of the currently accessed selection node is shorter than the initial execution time, the initial execution time may be updated as the longest execution time of the currently accessed selection node. For instance, in the example above, when $T_1<T_0$, L1 and L2 are respectively used as a first instruction and a second instruction of the scheduled instruction list, and $T_1$ is updated as the initial execution time in the meantime.

It should be understood that when the longest execution time corresponding to the currently accessed selection node is shorter than the initial execution time. By determining corresponding sorted instructions of the currently accessed selection node as instructions of a corresponding order in the scheduled instruction list, it may be guaranteed that the execution time of the instruction sequence in the obtained scheduled instruction list is shorter. A purpose of the above-mentioned scheme of updating the initial execution time is further improving instruction sorting and increasing processing efficiency of the system.

As an alternative example, the accessing the selection nodes, by the evaluation unit, and obtaining the corresponding longest execution time of the currently accessed selection node may include:

accessing the selection nodes in a preset accessing time period and obtaining the corresponding longest execution time of each selection node in the preset accessing time period. In the present example, instructions of each order of the scheduled instruction list may need to be decided by combining the method of the above-mentioned example.

Normally, an instruction list may include a plurality of instructions to be scheduled. A count of selection nodes obtained according to the instructions to be scheduled is huge. Therefore, in practice, there may not be enough time to traverse all selection nodes. The instruction list scheduling method of the present disclosure aims to further shorten the execution time of an instruction list by rearranging instructions in the instruction list. Based on this, as long as a new instruction list obtained by using the instruction list scheduling method of the disclosure shortens the execution time, the purpose of the disclosure may be realized. Thus, when using the instruction list scheduling method of the disclosure to rearrange instructions in practice, normally, the accessing time period may be set and scheduling time of instructions may be controlled according to actual needs.

As an alternative example, if longest execution time corresponding to a currently accessed selection node is not shorter than initial execution time, an instruction sequence of an instruction list to be scheduled may be determined as an instruction sequence of the scheduled instruction list.

In the present example, when the longest execution time corresponding to the currently accessed selection node is not shorter than the initial execution time, determining the instruction sequence of the instruction list to be scheduled as the instruction sequence of the scheduled instruction list is to optimize the instruction list scheduling method of the disclosure. It may be guaranteed that the instruction sequence in the obtained scheduled instruction list is an optimal result obtained in a preset time period.

As an alternative example, the accessing the selection nodes and obtaining the corresponding longest execution time of the currently accessed selection node may include:

step c: obtaining, by the evaluation unit, corresponding shortest execution time of the currently accessed selection node.

step d: if the corresponding shortest execution time of the currently accessed selection node is longer than the initial execution time $T_0$, terminating the accessing to selection nodes that are correlated with the currently accessed selection node. For instance, shortest execution time of a second selection node corresponding to the instruction L2 is $T_2$. $T_2$ corresponds to a situation where unsorted instructions C1, C2, S1, S2 corresponding to the selection node are perfectly parallel and are sorted in a most reasonable manner. If $T_2 > T_0$, accessing to a third selection node correlated to the second selection node may be terminated, accessing to a fourth selection node correlated to the third selection node may be terminated . . . , and accessing to a sixth selection node correlated to a fifth selection node may be terminated.

Since the evaluation unit consumes time to visit a selection node, the technical scheme of the example may improve the efficiency of instruction list scheduling by excluding invalid selection node accessing.

As an alternative example, the accessing the selection nodes, by the evaluation unit, and obtaining the corresponding longest execution time of the currently accessed selection node may include: following a random first rule (e.g., Monte Carlo Tree Search) to search the selection nodes for accessing, and obtaining the corresponding longest execution time of the currently accessed selection node.

As an alternative example, the accessing the selection nodes, by the evaluation unit, and obtaining the corresponding longest execution time of the currently accessed selection node may include: following a rule of BFS (Breadth First Search) to search the selection nodes for accessing, and obtaining the corresponding longest execution time of the currently accessed selection node. Specifically, the BFS in the example refers to: a selection node that is in the same order as the currently accessed selection node may be selected for accessing first. For instance, the currently accessed selection node is a second selection node, then another second selection node may be selected as a next selection node for accessing first.

As an alternative example, the accessing the selection nodes, by the evaluation unit, and obtaining the corresponding longest execution time of the currently accessed selection node may include: following a rule of DFS (Depth First Search) to search the selection nodes for accessing, and obtaining the corresponding longest execution time of the currently accessed selection node. Specifically, the DFS in the example refers to: a selection node that is in a next order correlated with the currently accessed selection node may be selected for accessing first. For instance, the currently accessed selection node is a second selection node, then a third selection node correlated with the second selection node may be selected as a next selection node for accessing first.

Alternatively, the evaluation unit may also adopt a rule that combines the random first rule and the DFS rule to search the selection nodes for accessing, or adopt a rule that combines the BFS rule and the DFS rule to search the selection nodes for accessing. Specifically, the evaluation unit may follow the BFS rule or the random first rule to search the selection nodes that are shorter than a preset order for accessing, and obtain the corresponding longest execution time of the currently accessed selection node; the evaluation unit may follow the DFS rule to search the selection nodes that are not shorter than a preset order for accessing, and obtain the corresponding longest execution time of the currently accessed selection node. Alternatively, a preset value corresponding to the order may be determined according to an empirical value or a result of a pre-experiment.

When scheduling an instruction list during an accessing time period, the evaluation unit of the instruction list scheduling device may not have enough time to traverse all selection nodes. At this point, merely adopting the DFS rule or the BFS rule to search selection nodes for accessing may lead to a situation that only limited selection nodes are accessed (e.g., only selection nodes that are correlated with a certain selection node are accessed, or only selection nodes of first several orders are accessed), whereas merely adopting the random first rule to search selection nodes for accessing may lead to a situation that selection nodes that are accessed have strong randomness. Thus, a scheme that combines the random first rule and the DFS rule to search the selection nodes for accessing, or a scheme that combines the BFS first rule and the DFS rule to search the selection nodes for accessing, may be adopted.

It should be understood that although each step of the flowchart is shown according to the direction of arrows, yet these steps may not necessarily be performed by following the order indicated by the arrows. Unless clearly stated herein, the order for performing these steps is not strictly prescribed, and these steps may be performed in a different order. Additionally, at least part of the steps of the flowchart may include a plurality of sub-steps or a plurality of phases. These sub-steps or phases may not necessarily be performed and completed at the same time, instead, these sub-steps or phases may be performed at a different time. These sub-steps or phases may not necessarily be performed in a sequence either, instead, these sub-steps or phases may be performed in turn or alternately with at least part of other steps, or sub-steps of other steps, or phases.

Figure 5:
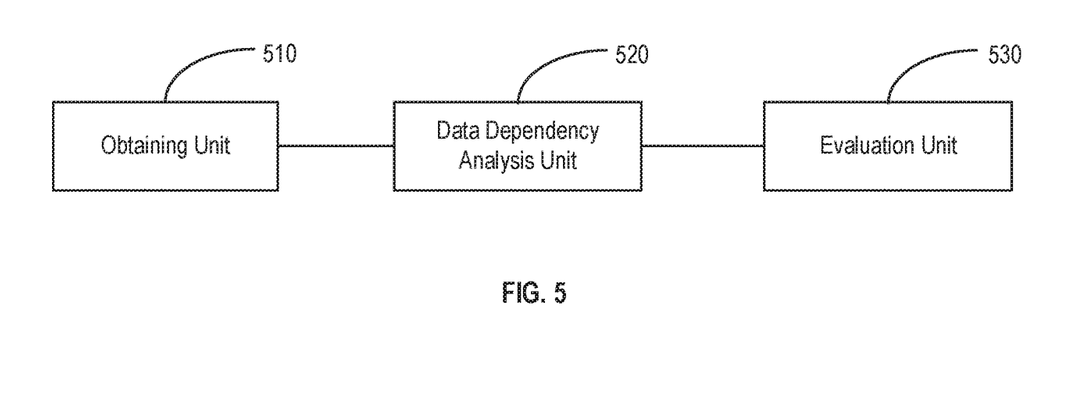
FIG. 5 is a structural diagram of an instruction list scheduling device according to an example of the present disclosure.

FIG. 5 is a structural diagram of the instruction list scheduling device according to an example of the present disclosure. The device may include an obtaining unit 510, a data dependency analysis unit 520, and an evaluation unit 530. The obtaining unit 510 may be configured to obtain an instruction set to be scheduled in an instruction list to be scheduled, and obtain all selection nodes of each instruction selection performed during an instruction scheduling process according to data dependencies among the instructions. The data dependency analysis unit 520 may be configured to perform a data dependency analysis on the instruction set to be scheduled to obtain the data dependencies among the instructions in the instruction set to be scheduled. The evaluation unit 530 may be configured to follow a preset rule to determine instructions of each order in the scheduled instruction list according to the selection nodes of corresponding orders.

In an example of the present disclosure, the evaluation unit 530 may access the selection nodes and obtain longest execution time corresponding to a currently accessed selection node; if the corresponding longest execution time of the currently accessed selection node is shorter than initial execution time, sorted instructions of the currently accessed selection node may be determined as instructions of a corresponding order in the scheduled instruction list; and the initial execution time is the execution time for an instruction sequence of the instruction list to be scheduled.

In an example of the present disclosure, the instruction scheduling device may further include an updating unit. The updating unit may be configured to update the initial execution time as the longest execution time of the currently accessed selection node if the corresponding longest execution time of the currently accessed selection node is shorter than the initial execution time.

In an example of the present disclosure, the evaluation unit 530 may be configured to access the selection nodes in a preset accessing time period, and obtain the longest execution time corresponding to the currently accessed selection node; if the longest execution time corresponding to the currently accessed selection node is shorter than the initial execution time, the evaluation unit 530 may determine corresponding sorted instructions of the currently accessed selection node as instructions of a corresponding order in the scheduled instruction list; and the initial execution time is the execution time for the instruction sequence of the instruction list to be scheduled.

In an example of the present disclosure, the evaluation unit 530 may be configured to determine the instruction sequence of the instruction list to be scheduled as an instruction sequence of the scheduled instruction list if the longest execution time corresponding to the currently accessed selection node is not shorter than the initial execution time.

In an example of the present disclosure, the evaluation unit 530 may follow the random first rule to search the selection nodes for accessing, and obtain the longest execution time corresponding to the currently accessed selection node.

In an example of the present disclosure, the evaluation unit 530 may follow the BFS rule to search the selection nodes for accessing, and obtain the longest execution time corresponding to the currently accessed selection node.

In an example of the present disclosure, the evaluation unit 530 may follow the DFS rule to search the selection nodes for accessing, and obtain the longest execution time corresponding to the currently accessed selection node.

In an example of the present disclosure, the evaluation unit 530 may follow the BFS rule or the random first rule to search the selection nodes that are shorter than a preset order for accessing, and obtain the corresponding longest execution time of the currently accessed selection node; and the evaluation unit 530 may follow the DFS rule to search the selection nodes that are not shorter than a preset order for accessing, and obtain the corresponding longest execution time of the currently accessed selection node.

In an example of the present disclosure, the evaluation unit 530 may be configured to obtain shortest execution time corresponding to the currently accessed selection node; if the corresponding shortest execution time of the currently accessed selection node is longer than the initial execution time, the evaluation unit 530 may terminate the accessing to selection nodes that are correlated with the currently accessed selection node; the initial execution time is the execution time for the instruction sequence of the instruction list to be scheduled.

In an example of the present disclosure, the evaluation unit 530 may be configured to evaluate all corresponding selection nodes of a current order according to preset priority of instructions, obtain an evaluation result of the selection nodes of the current order, and determine corresponding instructions of the current order according to the evaluation result.

In an example of the present disclosure, the evaluation unit 530 may be configured to set priority of instructions according to the specific content and/or type of the current selection node.

In an example of the present disclosure, the evaluation unit 530 may be configured to determine corresponding instructions of a current order according to corresponding shortest execution time of all selection nodes of the current order.

A detailed description of the instruction list scheduling device can be found in the description of the instruction list scheduling method mentioned above, and will not be repeated herein. Each of the units in the instruction list scheduling device above may be wholly or partially implemented through software, hardware, and a combination of software and hardware. Each of the units may be embedded or independently arranged in a processor of a computer equipment in a form hardware, and may also be stored on a memory of the computer equipment in a form of software, so that the processor may call and perform corresponding operation of the respective units.

Figure 6:
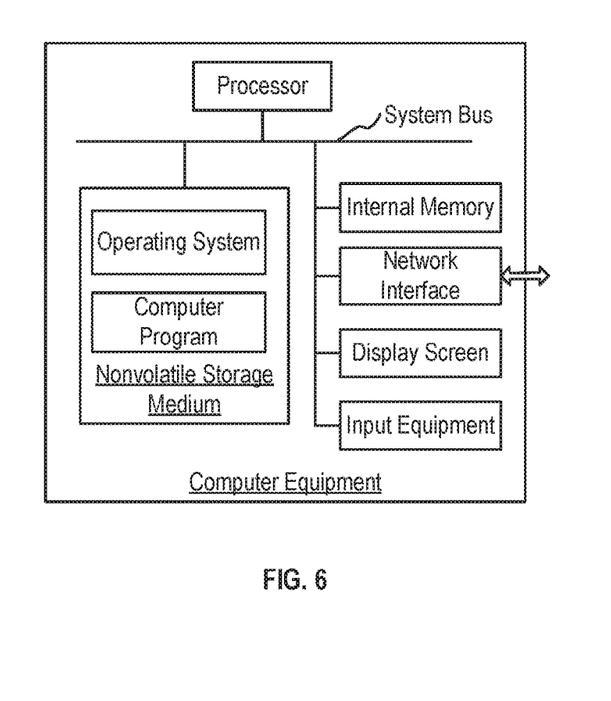
FIG. 6 is an internal structural diagram of a computer equipment according to an example of the present disclosure.

An example provides a computer equipment which may be a terminal whose internal structure may be a structure as shown in FIG. 6. The computer equipment may include a processor, a memory, a network interface, a display screen, and an input equipment which may be connected by a system bus. The processor of the computer equipment may be configured to provide computing and controlling capabilities. The memory of the computer equipment may include a nonvolatile storage medium and an internal memory. The nonvolatile storage medium may have an operating system and a computer program. The internal memory may provide an environment for the running of the operating system and the computer program in the nonvolatile storage medium. The network interface of the computer equipment may be configured to communicate with an external terminal via a network. When the computer program is executed by the processor, the computer program may realize the generation method of validation excitation and/or the method of chip verification mentioned in the example above. The display screen of the computer equipment may be a liquid crystal display screen or an electronic ink display screen. The input equipment of the computer equipment may be a touch surface layered on the display screen, and may be a button, a trackball, or a touch pad arranged on a case of the computer equipment, and may further be a keyboard, a touch pad, and a mouse externally connected to the computer equipment.

Those skilled in the art can understand that the structure shown in FIG. 6 is merely a block diagram of part of the structure related to the present disclosure, and is not considered to be a limit on the scope of the computer equipment with a scheme of the present disclosure applied in. The computer equipment may specifically include more or fewer components than the components shown in the figure, or may combine some components, or may have a different layout of components.

An example provides a computer equipment including a memory, a processor, and a computer program that are stored in the memory and can run on the processor. When the processor executes the computer program, the processor may realize the following steps: obtaining an instruction set to be scheduled in an instruction list to be scheduled, performing data dependency analysis on the instruction set to be scheduled to obtain data dependencies among the instructions; obtaining all selection nodes of each instruction selection performed during an instruction scheduling process according to the data dependencies among the instructions; and following a preset rule, determining instructions of each order in the scheduled instruction list according to selection nodes of a corresponding order.

In an example, when the processor executes the computer program, the processor may further realize the following steps: accessing the selection nodes and obtaining longest execution time corresponding to a currently accessed selection node; if the corresponding longest execution time of the currently accessed selection node is shorter than initial execution time, determining sorted instructions of the currently accessed selection node as instructions of a corresponding order in the scheduled instruction list; and the initial execution time is the execution time of an instruction sequence of the instruction list to be scheduled.

In an example, when the processor executes the computer program, the processor may further realize the following steps: if the corresponding longest execution time of the currently accessed selection node is shorter than the initial execution time, updating the initial execution time as the longest execution time of the currently accessed selection node.

In an example of the present disclosure, when the processor executes the computer program, the processor may further realize the following steps: if the longest execution time corresponding to the currently accessed selection node is shorter than the initial execution time, randomly generating an instruction sequence according to the sorted instructions of the currently accessed selection node, and using the randomly generated instruction sequence to update the instruction sequence of the instruction list to be scheduled.

In an example, when the processor executes the computer program, the processor may further realize the following steps: accessing the selection nodes in a preset accessing time period and obtaining the longest execution time corresponding to the currently accessed selection node; if the corresponding longest execution time of the currently accessed selection node is shorter than the initial execution time, determining the sorted instructions corresponding to the currently accessed selection node as instructions of a corresponding order in the scheduled instruction list; and the initial execution time is the execution time for the instruction sequence of the instruction list to be scheduled.

In an example, when the processor executes the computer program, the processor may further realize the following steps: following the BFS rule to search the selection nodes for accessing, and obtaining the longest execution time corresponding to the currently accessed selection node.

In an example, when the processor executes the computer program, the processor may further realize the following steps: following the random first rule to search the selection nodes for accessing, and obtaining the longest execution time corresponding to the currently accessed selection node.

In an example, when the processor executes the computer program, the processor may further realize the following steps: following the BFS rule to search the selection nodes for accessing, and obtaining the longest execution time corresponding to the currently accessed selection node.

In an example, when the processor executes the computer program, the processor may further realize the following steps: following the BFS rule or the random first rule to search the selection nodes that are shorter than a preset order for accessing, and obtaining the corresponding longest execution time of the currently accessed selection node; following the DFS rule to search the selection nodes that are not shorter than the preset order for accessing, and obtaining the corresponding longest execution time of the currently accessed selection node.

In an example, when the processor executes the computer program, the processor may further realize the following steps: obtaining shortest execution time corresponding to the currently accessed selection node; if the corresponding shortest execution time of the currently accessed selection node is longer than the initial execution time, terminating the accessing to selection nodes that are correlated with the currently accessed selection node; and the initial execution time is the execution time for the instruction sequence of the instruction list to be scheduled.

In an example, when the processor executes the computer program, the processor may further realize the following steps: evaluating all the corresponding selection nodes of a current order according to preset priority of instructions, obtaining an evaluation result of the selection nodes of the current order, and determining corresponding instructions of the current order according to the evaluation result.

In an example, when the processor executes the computer program, the processor may further realize the following steps: setting priority of instructions according to the specific content and/or type of the current selection node.

In an example, when the processor executes the computer program, the processor may further realize the following steps: determine corresponding instructions of the current order according to the corresponding shortest execution time of all selection nodes of the current order.

An example provides a computer readable storage medium. A computer program may be stored in the medium. When a processor executes the computer program, the following steps may be realized: obtaining an instruction set to be scheduled in an instruction list to be scheduled, performing data dependency analysis on the instruction set to be scheduled to obtain data dependencies among the instructions; obtaining all selection nodes of each instruction selection performed during an instruction scheduling process according to the data dependencies among the instructions; and following a preset rule, determining instructions of each order in the scheduled instruction list according to selection nodes of a corresponding order.

In an example, when the processor executes the computer program, the following steps may be realized: accessing the selection nodes and obtaining longest execution time corresponding to a currently accessed selection node; if the corresponding longest execution time of the currently accessed selection node is shorter than initial execution time, determining sorted instructions of the currently accessed selection node as instructions of a corresponding order in the scheduled instruction list; and the initial execution time is the execution time for an instruction sequence of the instruction list to be scheduled.

In an example, when the processor executes the computer program, the following steps may be realized: when the corresponding longest execution time of the currently accessed selection node is shorter than the initial execution time, updating the initial execution time as the longest execution time of the currently accessed selection node.

In an example, when the processor executes the computer program, the following steps may be realized: accessing the selection nodes in a preset accessing time period, and obtaining longest execution time corresponding to the currently accessed selection node; if the longest execution time corresponding to the currently accessed selection node is shorter than the initial execution time, determining corresponding sorted instructions of the currently accessed selection node as instructions of a corresponding order in the scheduled instruction list; and the initial execution time is the execution time for an instruction sequence of the instruction list to be scheduled.

In an example of the present disclosure, when the processor executes the computer program, the following steps may be realized: if longest execution time corresponding to the currently accessed selection node is not shorter than the initial execution time, determining the instruction sequence of the instruction list to be scheduled as an instruction sequence of the scheduled instruction list.

In an example of the present disclosure, when the processor executes the computer program, the following steps may be realized: following the random first rule to search the selection nodes for accessing, and obtaining the longest execution time corresponding to the currently accessed selection node.

In an example of the present disclosure, when the processor executes the computer program, the following steps may be realized: following the DFS rule to search the selection nodes for accessing, and obtaining the longest execution time corresponding to the currently accessed selection node.

In an example of the present disclosure, when the processor executes the computer program, the following steps may be realized: following the BFS rule to search the selection nodes for accessing, and obtaining the longest execution time corresponding to the currently accessed selection node.

In an example of the present disclosure, when the processor executes the computer program, the following steps may be realized: following the BFS rule or the random first rule to search the selection nodes that are shorter than a preset order for accessing, and obtaining the corresponding longest execution time of the currently accessed selection node; following the DFS rule to search the selection nodes that are not shorter than the preset order for accessing, and obtaining the corresponding longest execution time of the currently accessed selection node.

In an example of the present disclosure, when the processor executes the computer program, the following steps may be realized: obtaining shortest execution time corresponding to the currently accessed selection node; if the corresponding shortest execution time of the currently accessed selection node is longer than the initial execution time, terminating the accessing to selection nodes that are correlated with the currently accessed selection node; and the initial execution time is the execution time for the instruction sequence of the instruction list to be scheduled.

In one example, when the processor executes the computer program, the following steps may be realized: evaluating all the corresponding selection nodes of a current order according to preset priority of instructions, obtaining an evaluation result of the selection nodes of the current order, and determining the corresponding instructions of the current order according to the evaluation result.

In an example of the present disclosure, when the processor executes the computer program, the following steps may be realized: setting priority of instructions according to the specific content and/or type of the current selection node.

In an example of the present disclosure, when the processor executes the computer program, the following steps may be realized: determining corresponding instructions of the current order according to corresponding shortest execution time of all selection nodes of the current order.

Those of ordinary skill in the art can understand that, all or part of the process of the above-mentioned example method may be realized by a computer program instructing related hardware. The computer program may be stored in a nonvolatile computer readable storage medium. When the computer program is executed, the process of the above-mentioned example method may be included.

Moreover, the example of the present disclosure further provides a computer readable storage medium with a computer program stored in. When the computer program is executed by one or more processors, the computer program may realize the steps mentioned in the method above. The computer storage medium may include a nonvolatile memory and/or a volatile memory. The nonvolatile memory may include ROM (Read Only Memory), PROM (Programmable ROM), EPROM (Electrically PROM), EEPROM (Electrically Erasable PROM), or flash memory. The volatile memory may include RAM (Random Access Memory) or external cache memory. By way of illustration, and rather than limitation, RAM may be obtained in various forms, such as SRAM (Static RAM), DRAM (Dynamic RAM), SDRAM (Synchronous DRAM), DDRSDRAM (Double Data Rate SDRAM), ESDRAM (Enhanced SDRAM), SLDRAM (Synchlink DRAM), RDRAM (Rambus Direct RAM), DRDRAM (Direct Rambus Dynamic RAM), and RDRAM (Rambus Dynamic RAM).

In the example of the present disclosure, the offline model of the current original network may merely store necessary network structure information such as corresponding model parameters and instructions of the respective compute node of the original network, as well as interface data of the respective compute nodes of the original network. Thus, data of the offline model of the original network may be far lighter than data of the current original network, so that by running the offline model of the current original network, the processing of heavyweight data such as a neural network based on a secure runtime system built in a trusted execution environment such as TEE can be realized, and the application scope of a neural network can be expanded. Meanwhile, by directly running the corresponding offline model of the current original network on the computer equipment, there is no need to perform processing operation such as compiling on each compute node of the current original network, so that the processing speed and efficiency of the computer equipment may be increased.

Although the examples above only show several implementation modes of the disclosure, and the description of the examples is relatively specific and detailed, they are not to be considered as limitation of the scope of the present disclosure. It should be noted that, those of ordinary skill in the art can make various changes and improvements which shall fall within the protection scope of the present disclosure. Therefore, the protection scope of the present disclosure is subject to the protection scope in the claims.

The invention claimed is:

1. A method for scheduling an instruction list, the method comprising:
   obtaining an instruction set in the instruction list to be scheduled;
   determining data dependencies among instructions in the instruction set by performing a data dependency analysis on the instruction set;
   obtaining, based on the data dependencies, selection nodes for performing instruction selections during the scheduling of the instruction list; and
   determining, based on a preset rule, an order of instructions in a scheduled instruction list according to a corresponding order of the selection nodes, comprising:
   accessing a selection node and obtaining a longest execution time corresponding to the selection node; and
   when the longest execution time is shorter than an initial execution time:

determining an order of sorted instructions of the selection node as the order of corresponding instructions in the scheduled instruction list; and changing the initial execution time to the longest execution time, wherein the initial execution time corresponds to an execution time of an instruction sequence in the instruction list to be scheduled.

2. The method of claim 1, wherein accessing the selection node comprises:

accessing the selection node within a preset time period.

3. The method of claim 1, comprising:

when the longest execution time is equal to or longer than the initial execution time, determining an order of instructions in the instruction list to be scheduled as the order of instructions in the scheduled instruction list.

4. The method of claim 1, wherein accessing the selection node comprises:

accessing the selection node based on a random-first rule.

5. The method of claim 1, wherein accessing the selection comprises:

accessing the selection node based on a breadth-first rule.

6. The method of claim 1, wherein accessing the selection node comprises:

accessing the selection node based on a depth-first rule.

7. The method of claim 1, wherein accessing the selection node comprises:

selecting selection nodes that are smaller than a preset order for accessing based on a breadth-first rule or a random-first rule; and selecting selection nodes that are equal to or larger than the preset order for accessing based on a depth-first rule.

8. The method of claim 1, comprising:

obtaining a shortest execution time corresponding to the selection node; and when the shortest execution time is longer than the initial execution time, terminating accessing selection nodes that are correlated with the selection node currently being accessed.

9. The method of claim 1, wherein determining the order of instructions in the scheduled instruction list comprises:

evaluating selection nodes corresponding to a current order based on preset priorities of the instructions to obtain an evaluation result; and determining corresponding instructions of the current order based on the evaluation result.

10. The method of claim 9, comprising:

setting priorities of respective instructions based on at least one of a content or type of a current selection node.

11. The method of claim 1, wherein determining the order of instructions in the scheduled instruction list comprises:

determining corresponding instructions of a current order based on a shortest execution time of a respective selection node of the current order.

12. A system for scheduling an instruction list, the system comprising:

a memory storing a computer program; and a processor coupled to the memory and configured to execute the computer program to perform operations, the operations comprising:

obtaining an instruction set in the instruction list to be scheduled;

determining data dependencies among instructions in the instruction set by performing a data dependency analysis on the instruction set;

obtaining, based on the data dependencies, selection nodes for performing instruction selections during the scheduling of the instruction list; and determining, based on a preset rule, an order of instructions in a scheduled instruction list according to a corresponding order of the selection nodes, comprising:

accessing a selection node and obtaining a longest execution time corresponding to the selection node; and when the longest execution time is shorter than an initial execution time:

determining an order of sorted instructions of the selection node as the order of corresponding instructions in the scheduled instruction list; and changing the initial execution time to the longest execution time, wherein the initial execution time corresponds to an execution time of an instruction sequence in the instruction list to be scheduled.

13. The system of claim 12, wherein the operations comprise:

when the longest execution time is equal to or longer than the initial execution time, determining an order of instructions in the instruction list to be scheduled as the order of instructions in the scheduled instruction list.

14. The system of claim 12, wherein the operations comprise:

accessing the selection node based on at least one of a random-first rule, a breadth-first rule, or a depth-first rule.

15. The system of claim 12, wherein the operations comprise:

obtaining a shortest execution time corresponding to the selection node; and when the shortest execution time is longer than the initial execution time, terminating accessing selection nodes that are correlated with the selection node currently being accessed.

16. A non-transitory processor-readable storage medium storing a computer program that, when executed by a processor, causes the processor to perform operations comprising:

obtaining an instruction set in the instruction list to be scheduled;

determining data dependencies among instructions in the instruction set by performing a data dependency analysis on the instruction set;

obtaining, based on the data dependencies, selection nodes for performing instruction selections during the scheduling of the instruction list; and determining, based on a preset rule, an order of instructions in a scheduled instruction list according to a corresponding order of the selection nodes, comprising:

accessing a selection node and obtaining a longest execution time corresponding to the selection node; and when the longest execution time is shorter than an initial execution time:

determining an order of sorted instructions of the selection node as the order of corresponding instructions in the scheduled instruction list; and changing the initial execution time to the longest execution time, wherein the initial execution time corresponds to an execution time of an instruction sequence in the instruction list to be scheduled.

\* \* \* \* \*